United States Patent
Yamawaki (10) Patent No.: US 8,416,313 B2
(45) Date of Patent: Apr. 9, 2013

(54) IMAGE PROCESSING DEVICE FOR INPUTTING BOTH STILL PICTURE DATA AND MOTION PICTURE DATA AND PERFORMING A DATA PROCESS

(75) Inventor: Masashi Yamawaki, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 263 days.

(21) Appl. No.: 12/750,222

(22) Filed: Mar. 30, 2010

(65) Prior Publication Data

US 2010/0253795 A1    Oct. 7, 2010

(30) Foreign Application Priority Data

Apr. 1, 2009    (JP) ................... 2009-089441

(51) Int. Cl.
*H04N 5/228*    (2006.01)
*H04N 5/225*    (2006.01)

(52) U.S. Cl.
USPC ............ 348/222.1; 348/231; 348/220.1

(58) Field of Classification Search ........... 348/220.1, 348/222.1, 231.6
See application file for complete search history.

(56) References Cited

U.S. PATENT DOCUMENTS

| | | | |
|---|---|---|---|
| 7,110,025 B1 * | 9/2006 | Loui et al. | 348/220.1 |
| 7,899,573 B2 * | 3/2011 | Agapiou et al. | 700/175 |
| 7,990,423 B2 * | 8/2011 | Misawa | 348/220.1 |
| 2003/0095191 A1 * | 5/2003 | Saito | 348/220.1 |
| 2003/0169278 A1 * | 9/2003 | Obrador | 345/629 |
| 2004/0189819 A1 * | 9/2004 | Saito | 348/222.1 |
| 2004/0246344 A1 * | 12/2004 | Voss et al. | 348/220.1 |
| 2005/0146623 A1 * | 7/2005 | Juen | 348/220.1 |

FOREIGN PATENT DOCUMENTS

| | | |
|---|---|---|
| JP | 2001-238106 A | 8/2001 |
| JP | 2004-289636 A | 10/2004 |
| JP | 2005-142706 A | 6/2005 |
| JP | 2005-159712 | 6/2005 |

OTHER PUBLICATIONS

Japanese Office Action mailed Oct. 16, 2012 for corresponding Japanese Application No. 2009-089441, with partial English-language translation.

* cited by examiner

*Primary Examiner* — Hung Lam
(74) *Attorney, Agent, or Firm* — Fujitsu Patent Center (57) ABSTRACT

When a still picture is picked up by a digital camera, the still picture is divided into a plurality of areas and is processed for each area. After the process of one divided area is completed, then the process of a motion picture obtained from an imaging device. After the process of the motion picture is completed, another divided area of the still picture is processed again. Such switching between a motion picture process and a still picture process is performed until the process of the entire still picture is completed. Thus, after a still picture is picked up by a digital camera, a motion picture can be promptly displayed and a live image picked up by the camera can be displayed on a back LCD screen.

9 Claims, 14 Drawing Sheets

|   |    |    |    |    |    |    |    |    |    |
|---|----|----|----|----|----|----|----|----|----|
| 0 | R  | Gr | R  | Gr | R  | Gr | R  | Gr | R  |
| 1 | Gb | B  | Gb | B  | Gb | B  | Gb | B  | Gb |
| 2 | R  | Gr | R  | Gr | R  | Gr | R  | Gr | R  |
| 3 | Gb | B  | Gb | B  | Gb | B  | Gb | B  | Gb |
| 4 | R  | Gr | R  | Gr | R  | Gr | R  | Gr | R  |
| 5 | Gb | B  | Gb | B  | Gb | B  | Gb | B  | Gb |
| 6 | R  | Gr | R  | Gr | R  | Gr | R  | Gr | R  |

← WHEN HERE IS A DIVIDED RE-STARTING POSITION, THE HEAD PIXEL CAN BE LEFT "R".

← WHEN HERE IS A DIVIDED RE-STARTING POSITION, THE HEAD PIXEL MUST BE "GB".

FIG. 5

|   |    |    |    |    |    |    |    |    |    |   |
|---|----|----|----|----|----|----|----|----|----|---|
| 0 | R  | Gr | R  | Gr | R  | Gr | R  | Gr | R  | Group 1 : Gain a / Offset a' |
| 1 | Gb | B  | Gb | B  | Gb | B  | Gb | B  | Gb | Group 2 : Gain b / Offset b' |
| 2 | R  | Gr | R  | Gr | R  | Gr | R  | Gr | R  | Group 3 : Gain c / Offset c' |
| 3 | Gb | B  | Gb | B  | Gb | B  | Gb | B  | Gb | Group 4 : Gain d / Offset d' |
| 4 | R  | Gr | R  | Gr | R  | Gr | R  | Gr | R  | Group 6 : Gain e / Offset e' |
| 5 | Gb | B  | Gb | B  | Gb | B  | Gb | B  | Gb | Group 7 : Gain f / Offset f' |
| 6 | R  | Gr | R  | Gr | R  | Gr | R  | Gr | R  | Group 8 : Gain g / Offset g' |
| 7 | Gb | B  | Gb | B  | Gb | B  | Gb | B  | Gb | Group 1 : Gain a / Offset a' |
| 8 | R  | Gr | R  | Gr | R  | Gr | R  | Gr | R  | Group 2 : Gain b / Offset b' |

THE HEAD GROUP MUST BE THE RE-STARTING POSITION GROUP 7 OF THE DIVIDED DATA.

IMAGE PROCESSING DEVICE FOR INPUTTING BOTH STILL PICTURE DATA AND MOTION PICTURE DATA AND PERFORMING A DATA PROCESS

CROSS-REFERENCE TO THE RELATED APPLICATION

This application is based upon and claims the benefit of priority of the prior Japanese Patent Application No. 2009-089441, filed on Apr. 1, 2009, the entire contents of which are hereby incorporated by reference.

FIELD

The embodiment discussed herein relates to an image processing device.

BACKGROUND

Recently, digital cameras are popular. In the digital camera a shutter chance is awaited while a motion picture displayed on the LCD screen of the back surface is viewed and is pressed when a good image appears. When the shutter is pressed, nothing is temporarily displayed on the LCD screen of the back surface (the camera blackouts) and after a while a picked image is displayed. Then, a real time motion picture is reflected.

Figure 1:
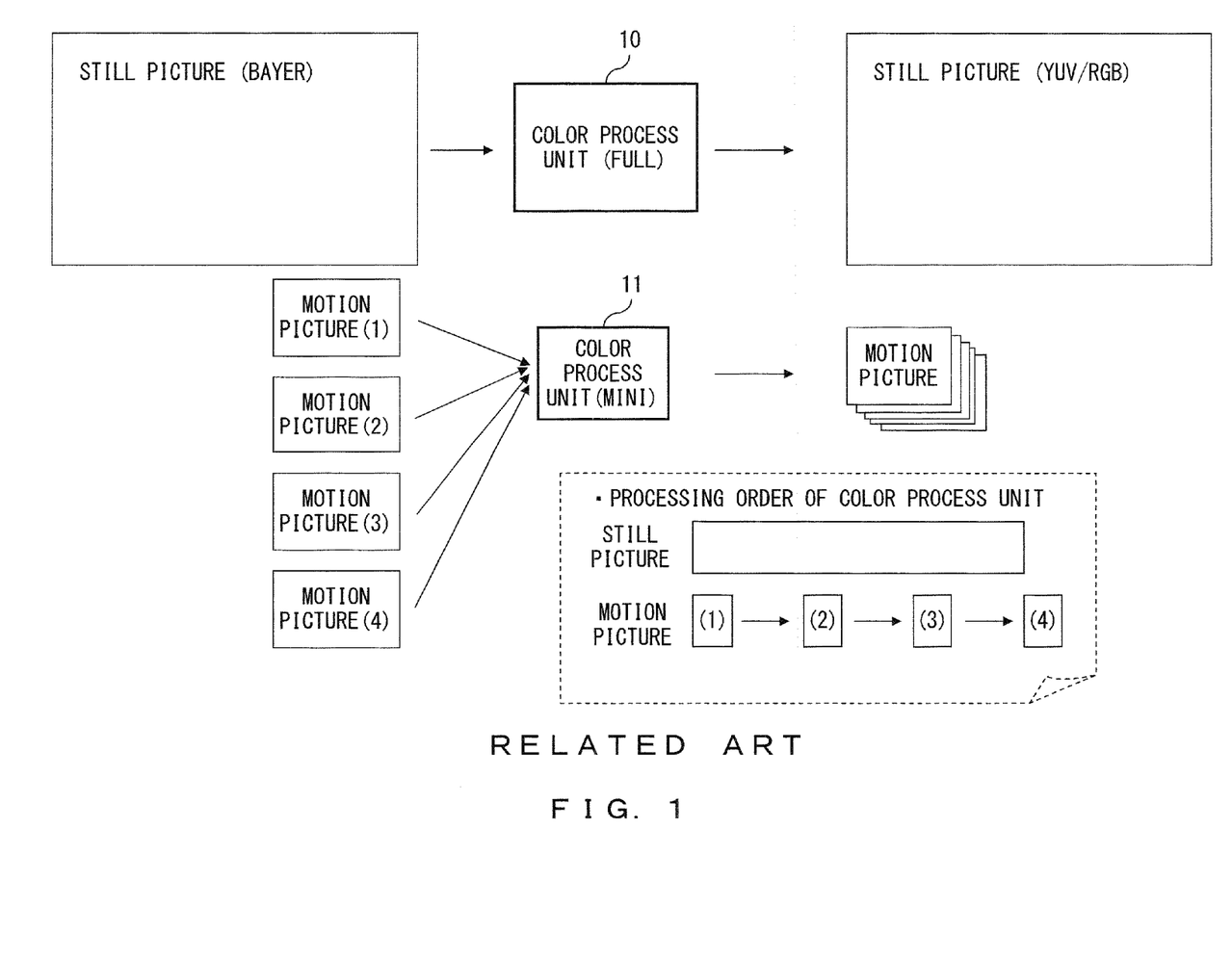
FIG. 1 explains how to process a still or motion picture conventionally.

FIG. 1 explains how to process a still or motion picture conventionally.

As illustrated in FIG. 1, conventionally, in order to display a motion picture on the back surface LCD screen during the process of a still picture, it may be necessary to prepare respective color process units (having a function to convert Bayer data between YUV/RGB, a function to convert resolution and the like) for both still and motion pictures. The difference between "full" and "mini" of the color process unit is the difference between their mounted functions ("full" has more settable process menus) or an amount of data to be handled ("full" may handle a large amount of data for a unit time). When the shutter is pressed, the Bayer data of a still picture is obtained. However, this data is processed by a color process unit 10 and is displayed or stored as a still picture. However, a motion picture being a live view is processed by a color process unit 11 which operates in parallel with the color process unit 10. When the shutter is pressed, a live-view motion picture is displayed on the back surface LCD screen immediately after a picked still picture is displayed. Thus, conventionally, in order to display a live-view motion picture on the back surface LCD screen while a still picture immediately after being picked up is being processed, respective color process units for both still and motion pictures had to be independently provided. Since this leads to the large-scaled hardware of a digital camera, it is not preferable for the configuration of a digital camera whose miniaturization is desired.

As disclosed by Patent document 2, a motion picture is not often processed while a still picture is processed (a live view is not displayed).

Patent document 1 discloses a digital camera capable of also realizing a dynamic display function by a larger number of pixels, also shortening pick-up intervals and saving consumption power.

Patent document 2 discloses a digital camera technology capable of improving serviceability such as live-view display and the like.

[Patent document 1] Japanese Laid-open Patent Publication No. 2004-289636
[Patent document 2] Japanese Laid-open Patent Publication No. 2001-238106

SUMMARY

According to an aspect of the embodiment, an image processing device for inputting both still picture data and motion picture data and performing a data process includes a process unit configured to divide the still picture data into a plurality of areas and alternating both the divided data process of the still picture and the process of the motion picture data and displays a motion picture during processing the still picture data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 2:
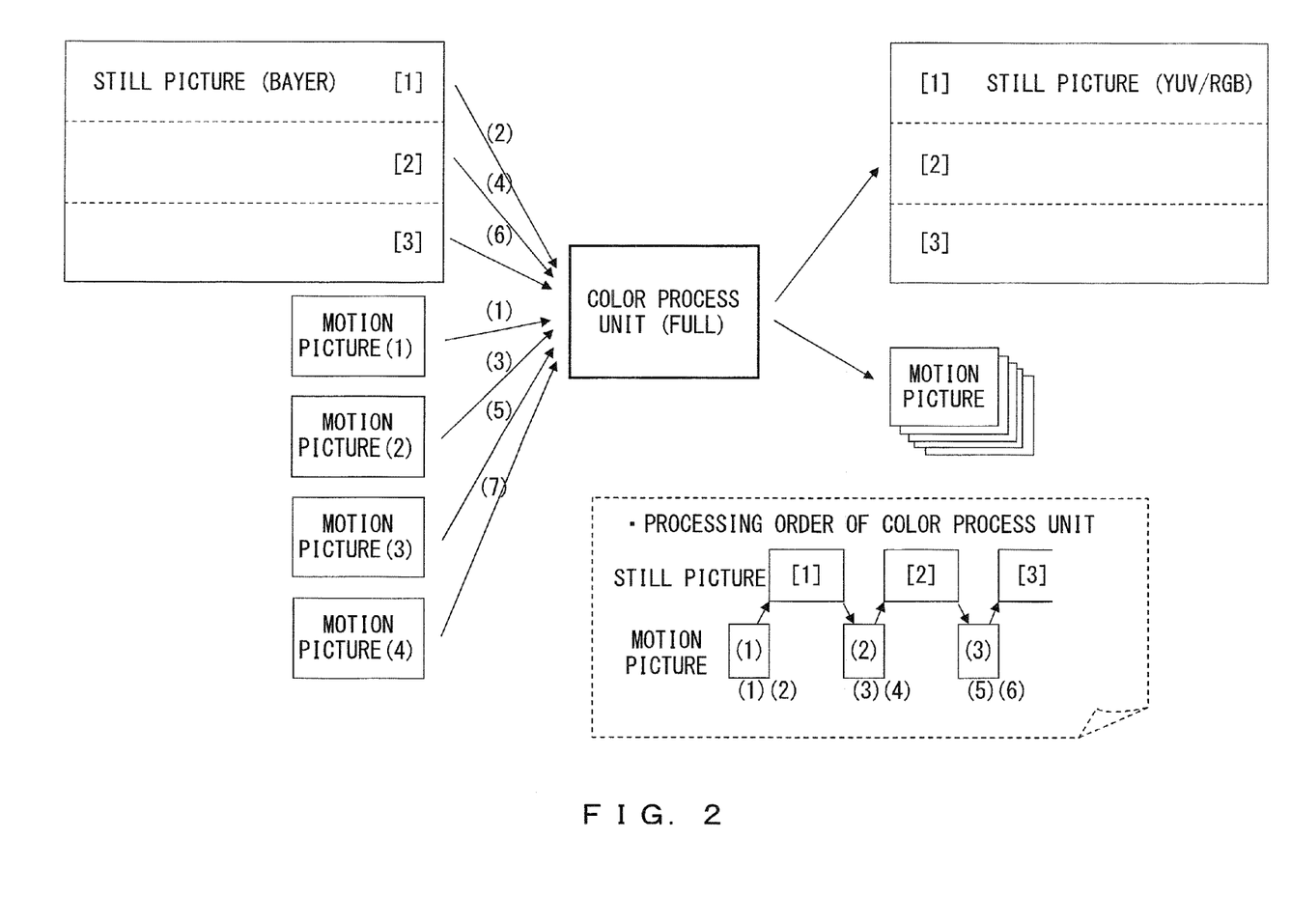
FIG. 2 explains the operation of the embodiment.

FIG. 2 explains the operation of the embodiment.

As illustrated in FIG. 2, a still picture is divided and processed (into three areas in FIG. 2) and during the time, motion picture data is inserted. In this case, when the still picture reaches the divided position, the process of the still picture is temporarily stopped. Then, process parameters (the setting of number of pixels to process and the like). (In this case, it is assumed that a motion picture is coarser than a still picture. This is because since a motion picture moves, even a somewhat coarser motion picture may also be used.) When returning to the still picture, the process parameters are retuned to for ones for a still picture and the process is started from the division head position. In FIG. 2, the Bayer data of a still picture is divided into three areas [1] through [3] and when a motion picture (1) is processed at first, the still picture [1] is processed. Then, a motion picture (2) is processed. Then, the still picture [2] is processed, then a motion picture (3) is processed and then the still picture [3] is processed. According to the preferred embodiment, only one color process unit is sufficient and also both still and motion pictures may be processed. Therefore, they may be processed while the amount of hardware may be suppressed to a minimum level.

When data is divided, the process re-starting position of divided still picture data has to be calculated.

As described earlier, when motion picture data is inserted between the divided areas, the process time of still picture data may become necessary. However, motion picture data may be processed at certain intervals. In this case, the color process unit performs normal filter processes (for example, processes using a Laplacian filter, such as defect correction/ outline emphasis/noise suppression and the like, are performed). These filter processes need the data of peripheral pixels in addition to the pixels to be processed.

Figure 3:
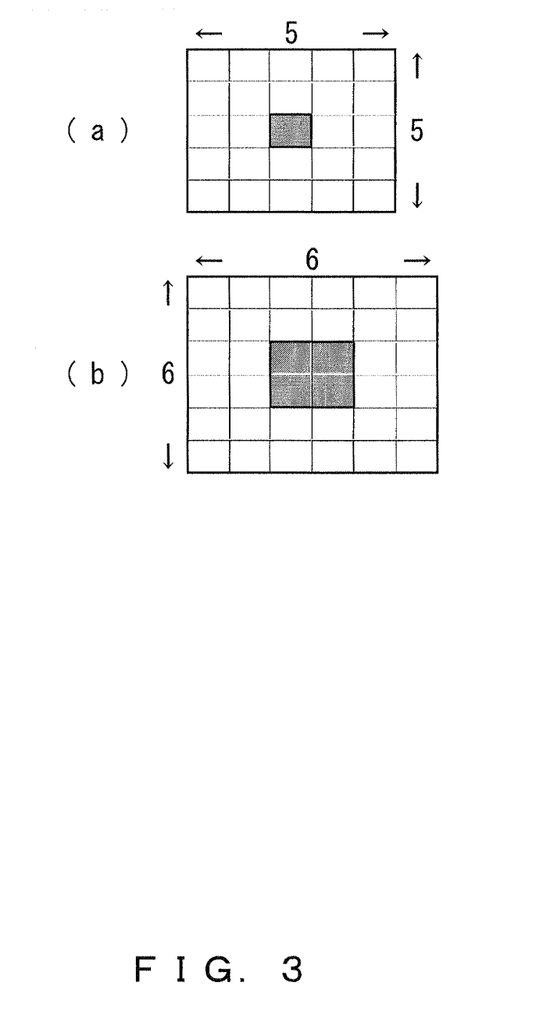
FIG. 3 illustrates example filters used in a filter process.

FIG. 3 illustrates example filters used in the filter process.

In the case of FIG. 3A, peripheral pixels needed to calculate a pixel positioned at the center are 5×5 pixels. Thus, one pixel at the center, using data of 25 (=5×5) pixels.

In the case of FIG. 3A, 24 peripheral pixels excluding ones at the center are usually discarded since there exit no peripheral pixels for calculation (even when 5×5 pixels are inputted, one pixel is outputted).

In the case of FIG. 3B, when 6×6 pixels are inputted in the above-described filter (5×5) process, 2×2 pixels are outputted. The peripheral pixels for this filter process have to be noted when image data is divided.

In the following description, it is assumed that a pixel area needed to process one pixel is the same 5×5 as described above.

Figure 4A:
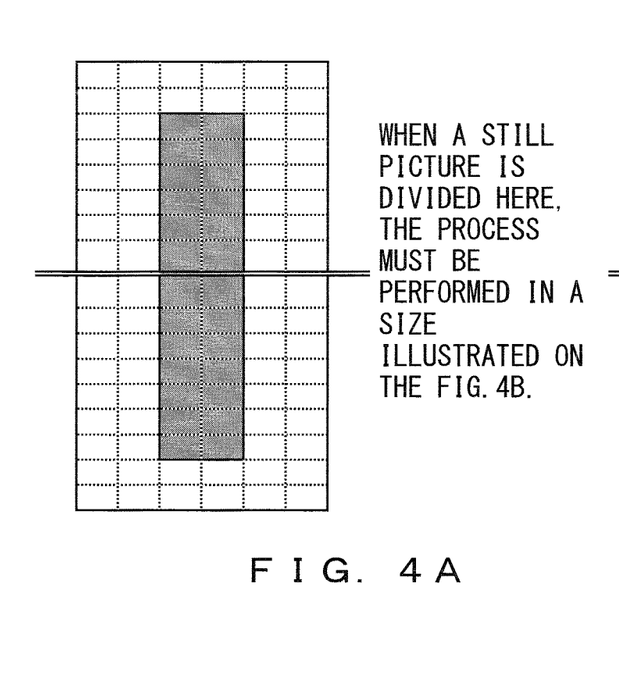
FIGS. 4A and 4B explain a data area to read in a divided part.
Figure 4B:
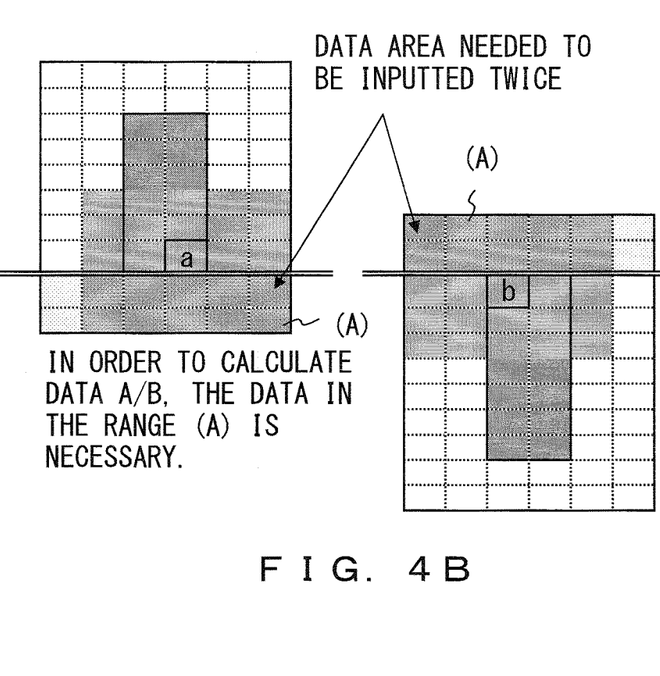

FIGS. 4A and 4B explain a data area to read in a divided part.

When data is divided into two areas at the center as illustrated in FIG. 4A, it is divided and processed as illustrated in FIG. 4B. However, data in the part (A) of FIG. 4B has to be processed twice. Namely, when the upper side area of a divided part is processed, two lines of area intruded toward the side lower than the divided part may be necessary. When the lower side area of a divided part is processed, two lines of area intruded toward the side upper than the divided part may become necessary. Thus, if image data is divided and processed when the filter process is performed, there exists data which has to be read twice. Hereinafter, these pixels to be read twice in the part intruded from the divided part are called "flap for fastening".

Next, points which are to be taken care of when the image data is divided and a re-sizing process (process for applying compression/enlargement to the inputted data and modifying the size of the image data: resolution conversion) is applied to the inputted data are explained.

When compression is applied in the re-sizing process, sampling (thinning out pixels at its process rate) is performed by a re-sizing ratio (interval for sampling). However, if the number of the sampling is odd when the image data is already divided, it fails when it is converted to YUV data (in the case of YUV422 and the like, the number of data has to be even) Therefore, it may be necessary to re-process data which falls odd, in a subsequent block.

As described above, when data to process is divided in the re-process of peripheral pixels in the filter process, in the re-process of an odd position in the re-sizing process and the like, it may be necessary to calculate the starting position of the divided area and the like, according to the size of a flap for fastening and the compression/enlargement of re-sizing.

Figure 5:
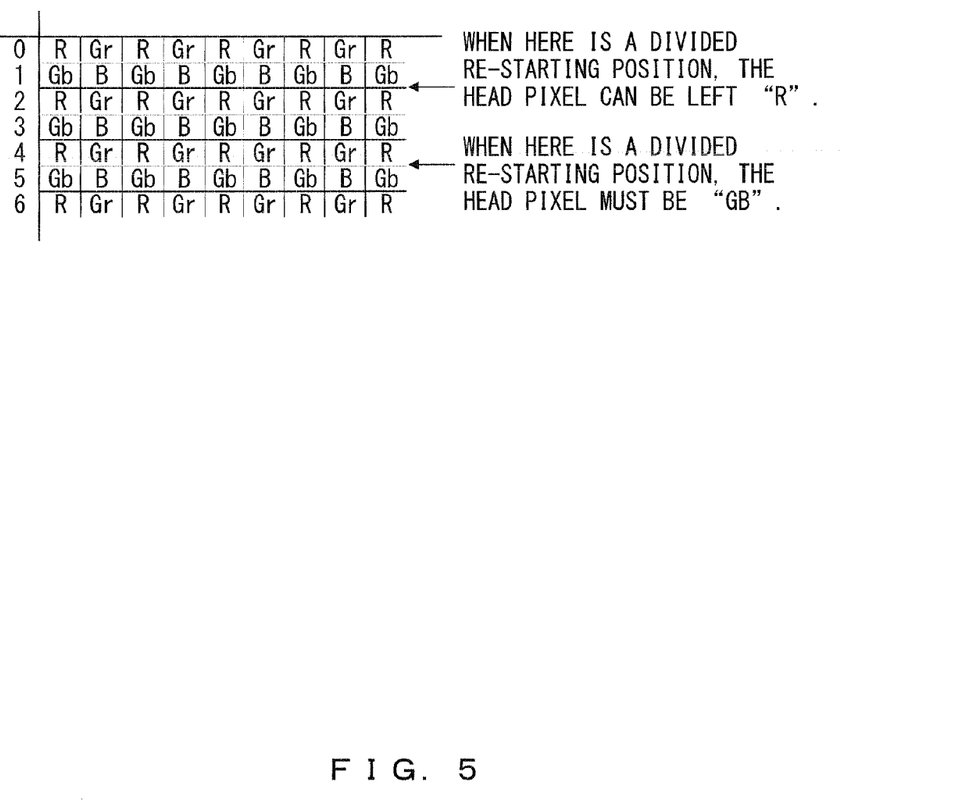
FIG. 5 illustrates Bayer data (No. 1).
Figure 6:
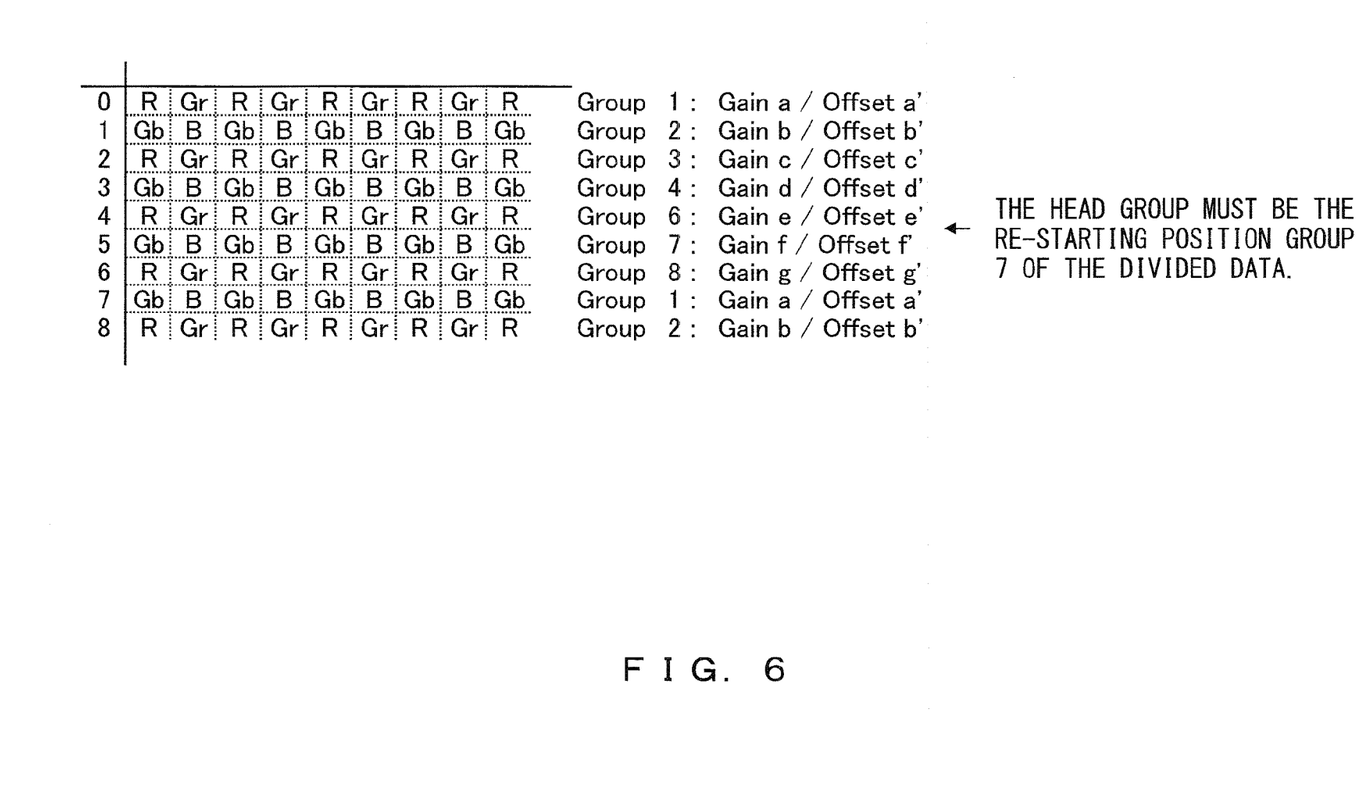
FIG. 6 illustrates Bayer data (No. 2).

FIGS. 5 and 6 illustrate Bayer data.

Bayer data to input is data in which pixel types as illustrated in FIG. 5 are arrayed. Pixel types (there are four types of R, Gb, Gr and B corresponding to red, green and blue in the pixel type) in the Bayer array, G and Gr are repeated in the upper line, and Gb and B are repeated in the lower line. One set of pixel type is composed of an array of 2×2 pixels. The two upper lines of this 2×2 array are R and Gr, and the two lower lines are Gb and B. Since it may be necessary for data to be inputted to the color process unit to correctly recognize the following pixel types of R, Gr, B and Gb, if its head is located in an odd position when still picture data is divided, it may be necessary to correct a pixel type. For example, if a position where it is vertically divided is odd when the current head is a red pixel, it may be necessary to correct a pixel type since a Gb pixel becomes its head.

Next, the group of Bayer data is briefly explained. FIG. 6 illustrates the group of Bayer data. Up to groups 1 through 8 are sequentially set from the 0-th line like group 1 for the 0-th line, group 2 for the first line, group 3 for the second line and so on. For the eighth line and after, groups 1 through 8 are repeated. In each group, a gain (value multiplied to a pixel value) and an off-set (off-set value for correcting a difference if the 0 value of a pixel value is different from an actual 0 value).

As to Bayer data sometimes a gain has to be given to it and its off-setting value has to be modified in units of lines. Therefore, when data is divided, it may be necessary to calculate to which group its division boundary belongs. Furthermore, although in FIG. 6 data is divided into eight groups for the purpose of explanation, the same also applies to when it is divided otherwise.

Besides this, as to the address of a storage destination storing YUV/RGB data, its position corresponding to the divided head data varies depending on the size of an area to be re-processed. When image data is divided, it may be necessary to apply its storage destination address, its gain, the correction value of its off-set and the like to its flap for fastening and the area to be re-processed generated in the re-sizing process referring to them.

When the process of the divided block is re-started, it is desired to promptly set the parameters of its read starting position (for example, the parameters of still picture [2] (its storage destination address, a pixel type and the like) in the case where the process of still picture [1]→motion picture (2)→picture [2] is performed).

In FIG. 2, in the setting of still picture [1], an initial value set against the entire still picture at the time of its design may be set (the number of pixels in the vertical direction to be processed differs). However, when motion picture (2) is processed, it may be necessary to rewrite parameters used by the color process unit (the number of pixels, the value of a pixel type and the like) into ones for a motion picture. Furthermore, when the flow returns to the process of still picture [2], it may be necessary to start it following the process of still picture [1].

In this case, since respective parameters of still picture [2] are calculated inside its hardware, the load of its firmware may be reduced by reporting these to the firmware and enabling it to re-set them at the re-starting time of the process.

However, since the position of a subsequent division block and the like may be necessarily determined by the number of pixels to be divided and processed, its flap for fastening and its parameters for resizing, handling by hardware are not necessarily needed and there is no problem even if they are all calculated by firmware.

As one example, its targets are the following parameters of a block whose process is restarted.

Type of its head pixel
Group value of its head line
Input source address of data Output destination address of data (respective output destination addresses of respective Y/Cb/Cr)

Starting position off-set at the time of a re-sizing process

Since these values quite vary depending on the amount of change from the ending end of a block processed first of divided still picture data to the starting end of a subsequent block to be processed, the process of a subsequent block may be easily re-started by calculating these parameters in advance at the completion of the process of the divided block.

Figure 7:
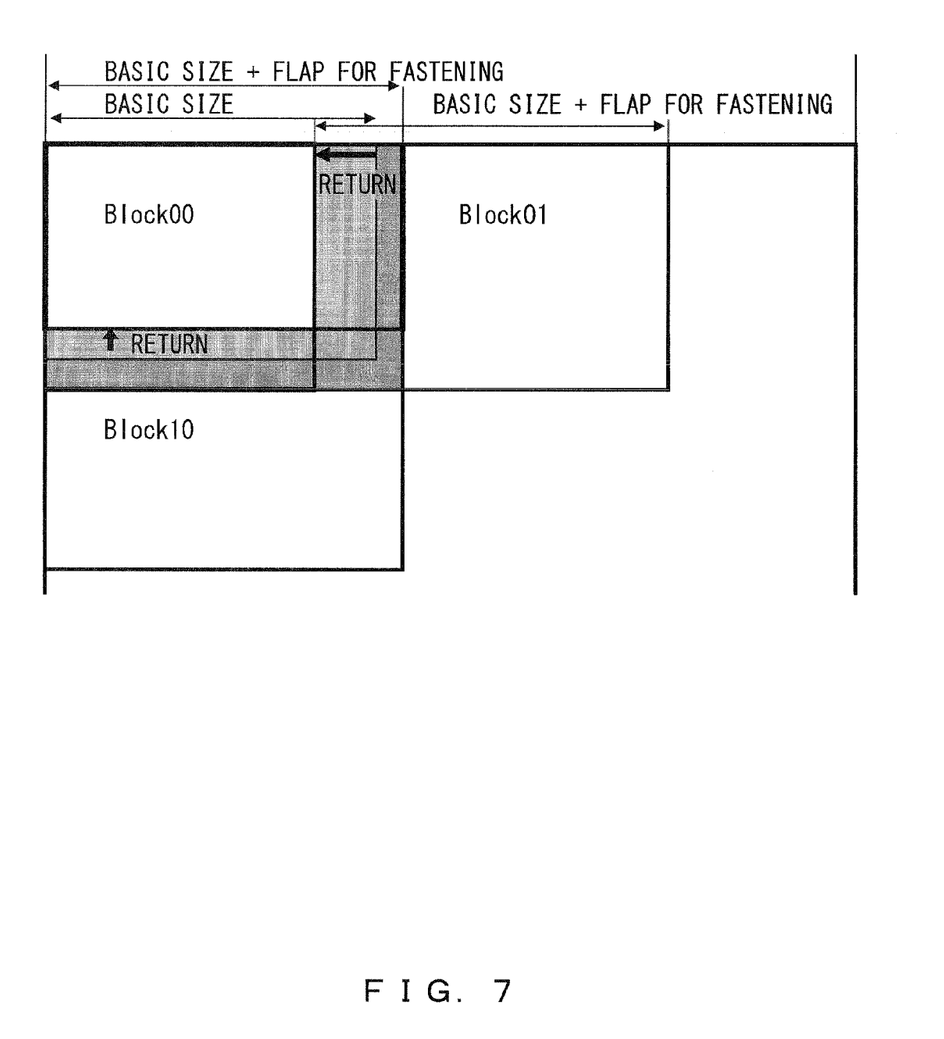
FIG. 7 explains how to determine both a re-process area and a starting off-set (No. 1).
Figure 8:
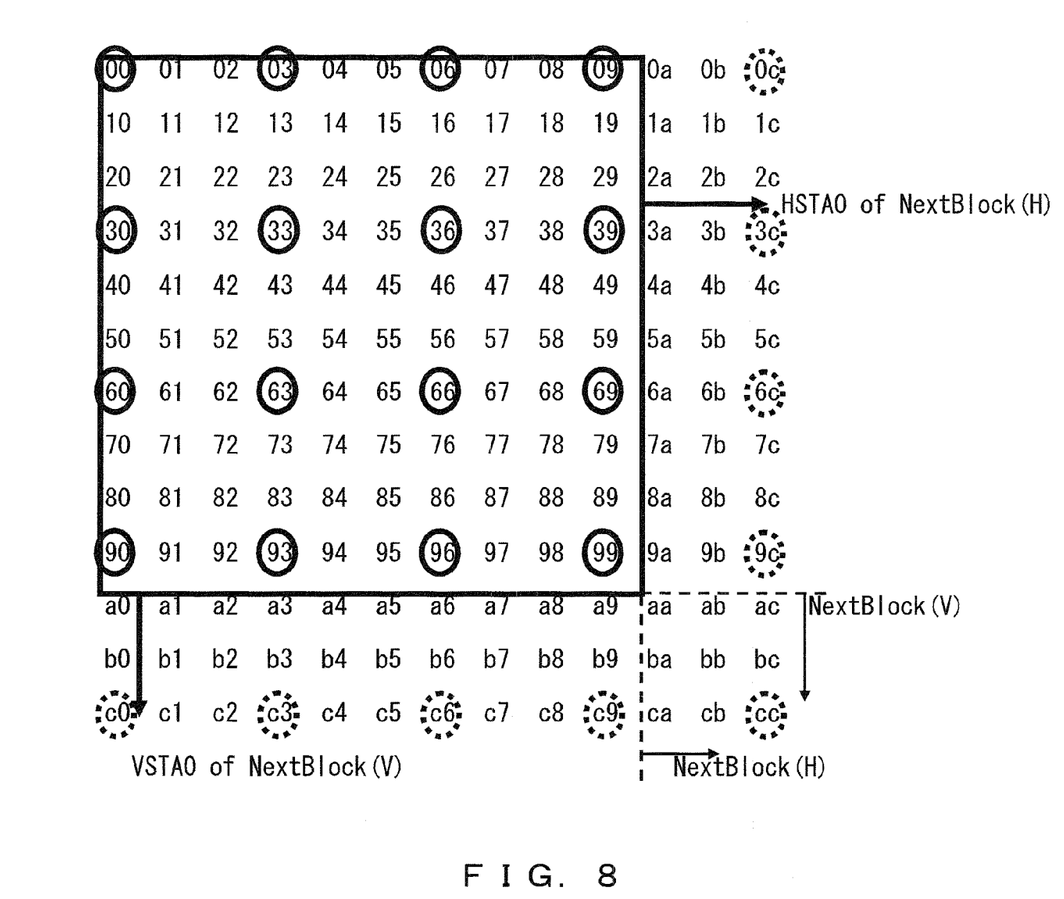
FIG. 8 explains how to determine both a re-process area and a starting off-set (No. 2).
Figure 9:
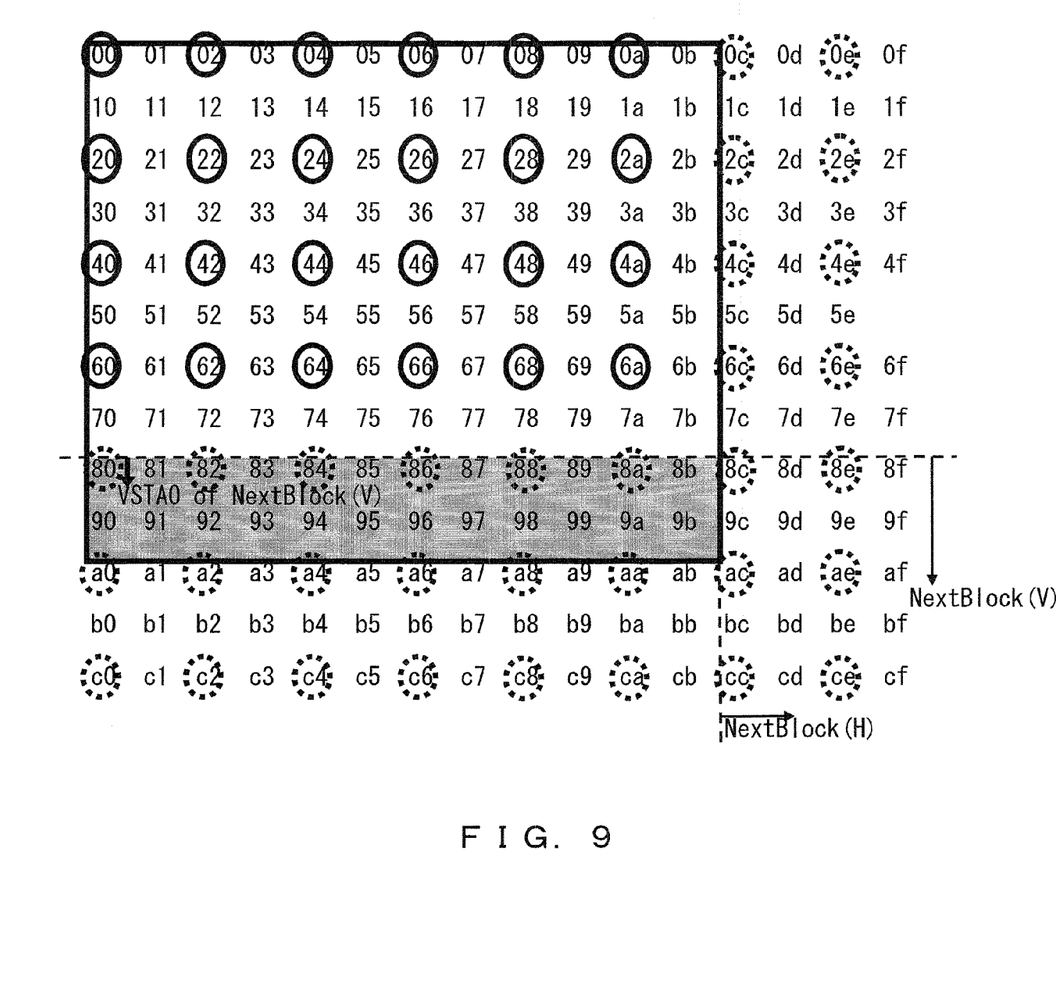
FIG. 9 explains how to determine both a re-process area and a starting off-set (No. 3).

FIGS. 7 through 9 explain how to determine both a re-process area (reference pixel at the time of re-sizing) and a starting off-set.

It may be necessary that the number of pixels in the result of resolution conversion (re-sizing) is even. This is because if it is odd, a chrominance may not be thinned out. Chrominance thinning is a process for reducing the total amount of data by thinning out chrominance pixels. The thinning of brightness pixels affects its image quality. However, the somewhat thinning of chrominance pixels does not affect its image quality. Therefore, if the output value of resolution conversion is odd, it may be necessary to re-process its last data in a subsequent block.

In the case of FIG. 7, respective blocks 00, 01 and 10 are divided in a basic size. However, in order to process each block to apply a filter process to pixels on a boundary between blocks, an extra flap for fastening may be necessary in addition to the basic size. "Return" illustrated in FIG. 7 indicates a portion inserted into the basic size area of block 00 in the case where the size of a basic size+a flap for fastening is used as the process unit of blocks 01 and 10. Each block is processed in the size of a basic size+a flap for fastening.

FIG. 8 illustrates the case where as to a resolution conversion input size, horizontal X vertical is 10×10 and H/VPIT0=3 (all STAs indicating a distance up to a pixel which is processed first are "0" at the time of process start). In this case, HPIT0/VOIT0 is a pitch size for resolution conversion (distance interval for conversion). HPIT0 and VPIT0 indicate horizontal and vertical directions, respectively. HSTA0/VSTA0 is a distance up to a pixel which is processed first in a subsequent block. HSTA0 and VSTA0 indicate horizontal and vertical directions, respectively. ○ is a sampling point and a dotted line indicates a invalid sampling point. When re-sizing is performed, pixels are thinned out from original image data at certain intervals. Image data left in this thinning is a sampling point.

In the case of FIG. 8, since re-sizing is performed by sampling a pixel with size 10×10 by a pitch size 3, its sampling point is 4×4 (even×even), its output size is 4×4 and a pixel size which is re-processed in a subsequent block becomes 0×0. A subsequent block in the horizontal direction starts from a line 0a (return 0) and (HSTA0, VSTA0)=(2, 0) (difference coordinate from 0a up to 0c). A subsequent block in the vertical direction starts from line a0 (return 0) and (HSTA0, VSTA0)=(0, 2) (difference coordinate from a0 up to c0). In this example illustrated in FIG. 8, when the process is shifted to a subsequent block, no area to be re-processed occurs.

In FIG. 9, horizontal×vertical is 12×10 and when HPIT0/VPIT0=2, all STAs are "0". In the case of FIG. 9, both vertical and horizontal are sampled every two pixels. Therefore, its sampling point is 6×5 (even×odd), its output size is 6×4 and a pixel size which is re-processed in a subsequent block becomes 0×2. A subsequent block in the horizontal direction starts from line 0c (return 0) and (HSTA0, VSTA0)=(0, 0). A subsequent block in the vertical direction starts from a line 80 (return 0) and (HSTA0, VSTA0)=(0, 0). For example, the boundary between the current block and a subsequent block is located at the 12-th pixel in the horizontal direction and at the 10-th pixel in the vertical direction. Therefore, the boundary is located at column 0b and line 90. When a subsequent block is processed, in the vertical direction, line returns from a0 to 80. Therefore, in the vertical direction, lines 80 to a0 become a re-process area.

Figure 10:
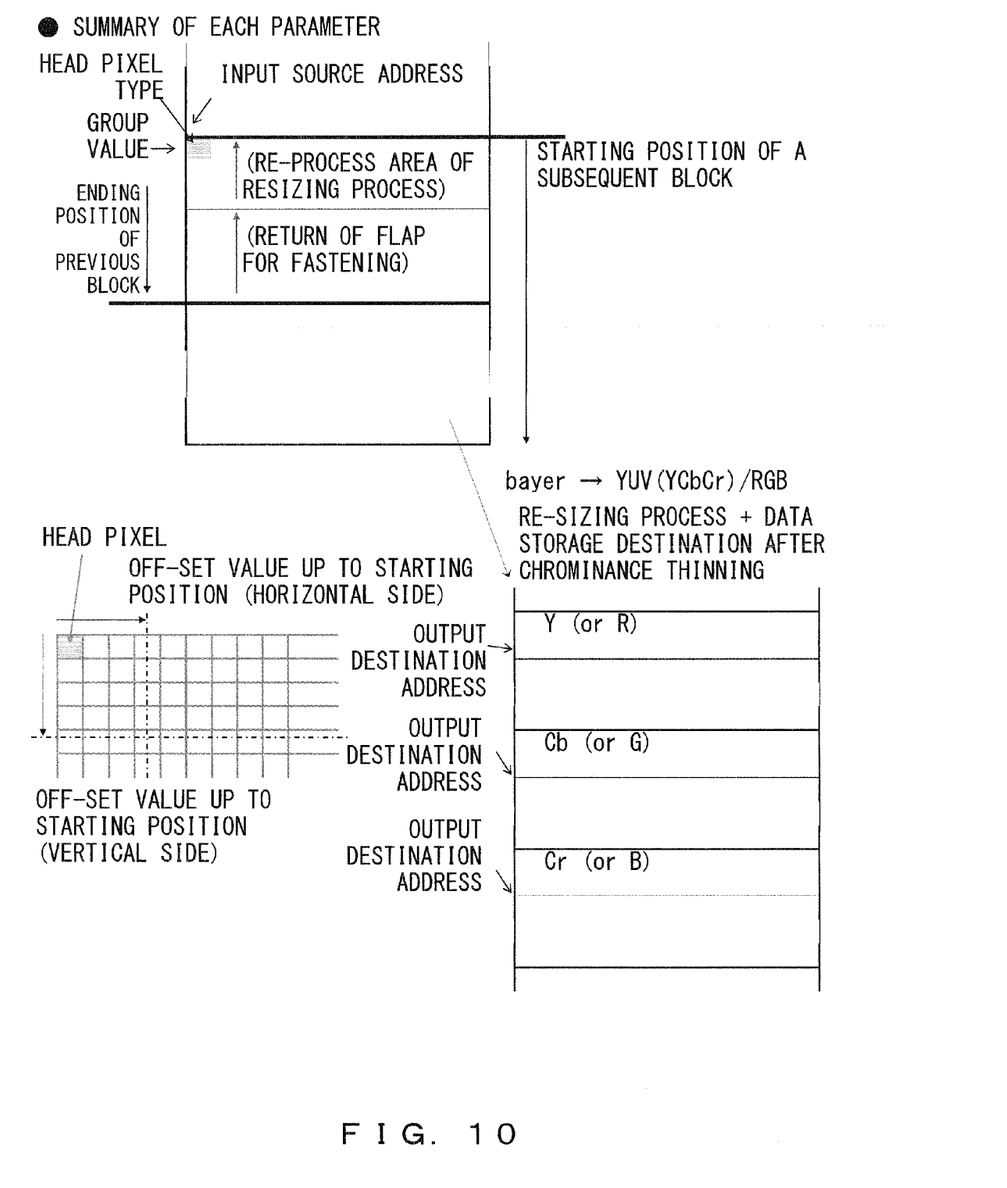
FIG. 10 explains each parameter.

As described above, an area to be re-processed occurs depending on a pixel size for process and a re-sizing process. FIG. 10 explains each parameter.

How to calculate these areas is illustrated in FIGS. 7 through 9. The starting position of a subsequent block returns by an area obtained by adding the return from the ending position of the previous position of a flap for fastening and the re-process area of a resizing process. The type of the head pixel in the position returned by this amount, a group value, an input source address and an output destination address are calculated. An output destination address is the storage destination address of data after both a resizing process and chrominance process. An input source address is the storage source address where data to be read is stored. If a re-process area size is known, each parameter may be calculated as follows.

Type of the Head Pixel

If the result of "division size−(flap for fastening+re-process area size)" (number of lines in the vertical direction) is odd, its pixel type is corrected. For example, since division is vertically performed, if the above balance is odd when the pixel type of the immediately previous block is "R", the pixel type in a subsequent starting position becomes "Gb". This is because since one set of pixel types is composed of two lines, the set is divided at the center when the number of lines is odd. Therefore, in this case, the pixel type is corrected from "R" to "Gb".

Group Value of the Head Line

The result of "division size−(flap for fastening+re-process area size)/number of groups" (number of lines in the vertical direction) or an expression equivalent to the above expression is calculated and the group is determined from the result. Because a group number is expressed by (repeated number of groups)×(number n of groups)+(group number (0 to n−1).

Input Source Address of Data

The result of "Ending position of previous block−(flap for fastening+re-process area size)*horizontal size" or an expression equivalent to the above expression is calculated and the address is determined. Since (flap for fastening+re-process area size) indicates the number of lines in the vertical direction, an address position returned by (flap for fastening+re-process area size) may be determined if the horizontal size of one line is known.

Output Destination Address of Data (Respective Output Destination Addresses of Y/Cb/Cr)

Since the output destination of Y/Cb/Cr has no relation to a return value, the address of a division boundary becomes the head address of a subsequent block. The respective output destination addresses of Y, Cb and Cr are independently determined. The same also applies to RGB.

Starting Position Off-Set at the Time of Resizing Process

The VSTA0 calculated in FIGS. 7 through 9 corresponds to this parameter. For example, a distance between the process starting position of a subsequent block and a sampling point to be processed first becomes a starting position off-set.

The divided block may be smoothly re-started by enabling hardware inside or firmware to calculate these parameters.

Figure 11:
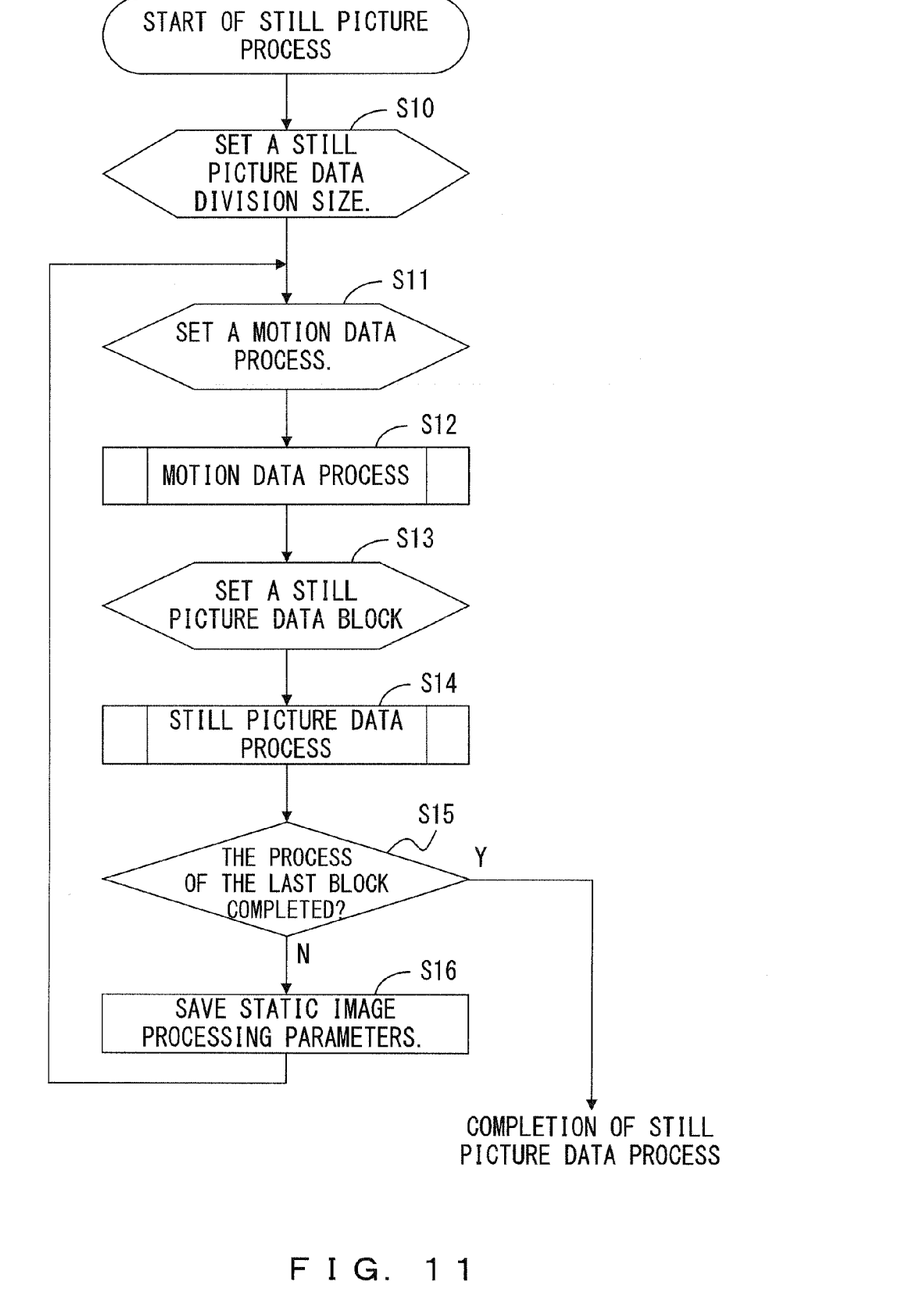
FIG. 11 is a process flow of the embodiment.

FIG. 11 is the process flow of this preferred embodiment.

The process flow illustrated in FIG. 11 is performed in firmware. In step S10, the division size of still picture data is calculated. The division size indicates the data size of each divided area when a still picture is divided and processed. In this case, the division size does not necessarily equal to the data size of a piece of motion picture. An interval at which motion picture data is inserted is controlled by this division size. If it is assumed that the number of motion picture frames displayed for one minute, the number of motion picture pixels, the number of horizontal pixels of a still picture and process speed per pixel are n, M, Sh and fMHz, respectively, the division size that may be processed for a time excluding that of a motion picture process (number of pixels in the vertical direction) is $(1/n-(M/f))/(Sh/f)$. $1/n$ is an interval at which a piece of motion picture is displayed. M/f may be obtained by calculating a process time per pixel by multiplying a motion picture size by a process time per pixel and subtracting the time from the interval per motion picture. Sh/f is a time for processing the horizontal size of a still picture (for one line). For example, it is assumed that 30 frames are displayed for one minute, QVGA size=76800 (=320×240) pixels, Sh=2000 pixels and f=50 MHz, the division size becomes 794.93 and the number of pixels in the vertical direction may be calculated to be approximately 790 pixels.

In step S11 a motion picture data process is set and in step S12 the motion picture data process is performed. In step S13 a still picture data block process is set. In this case, the head block is set to the initial value. The second block and after may also be reset using a parameter which is saved in step S16. In step S14, a still picture data process is performed. In step S15 it is determined whether the process of the last block is completed. If the determination in step S15 is no, in step S16 a still picture process parameter is saved and the process returns to step S11.

Figure 12:
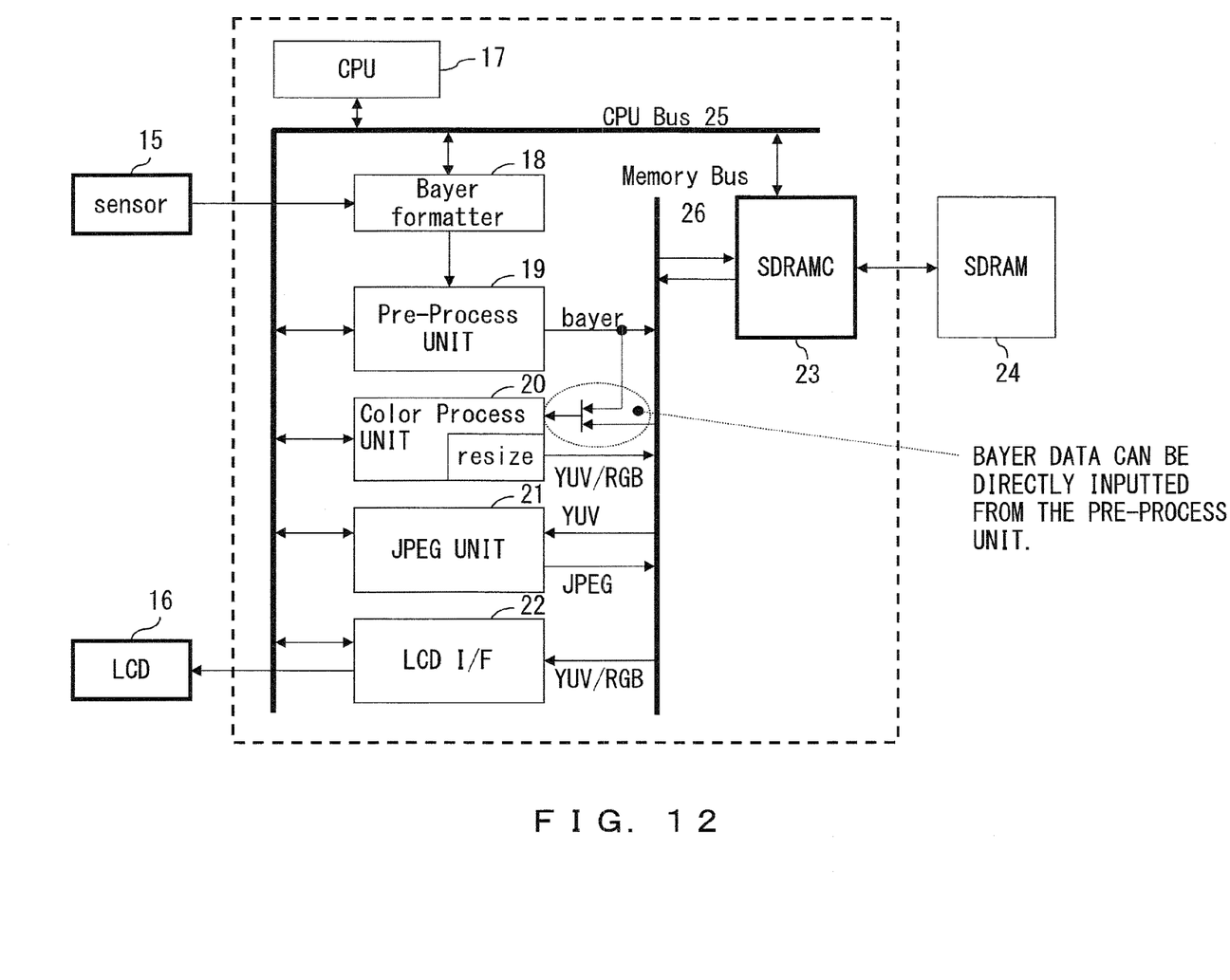
FIG. 12 is an overall configuration of an image processing device in the embodiment.

FIG. 12 is the overall configuration of a digital camera provided with the image processing device in the embodiment.

A CPU 17 is connected with each unit via a CPU bus 25. As to an image signal inputted from a sensor 15, raw signals are arrayed as illustrated in FIG. 5 by Bayer formatter 18. The Bayer data is corrected by a pre-process unit 19. The Bayer data outputted from the pre-process unit 19 is converted to a YUV signal by a color process unit 20, which is enlarged/compressed by a re-sizing unit. The image data of the YUV signal is converted to JPEG by a JPEG unit 21 and is stored in an SDRAM 24 via a memory bus 26 and an SDRAM controller 23. A motion picture is displayed on an LCD 16 via an LCD I/F 22.

Figure 13:
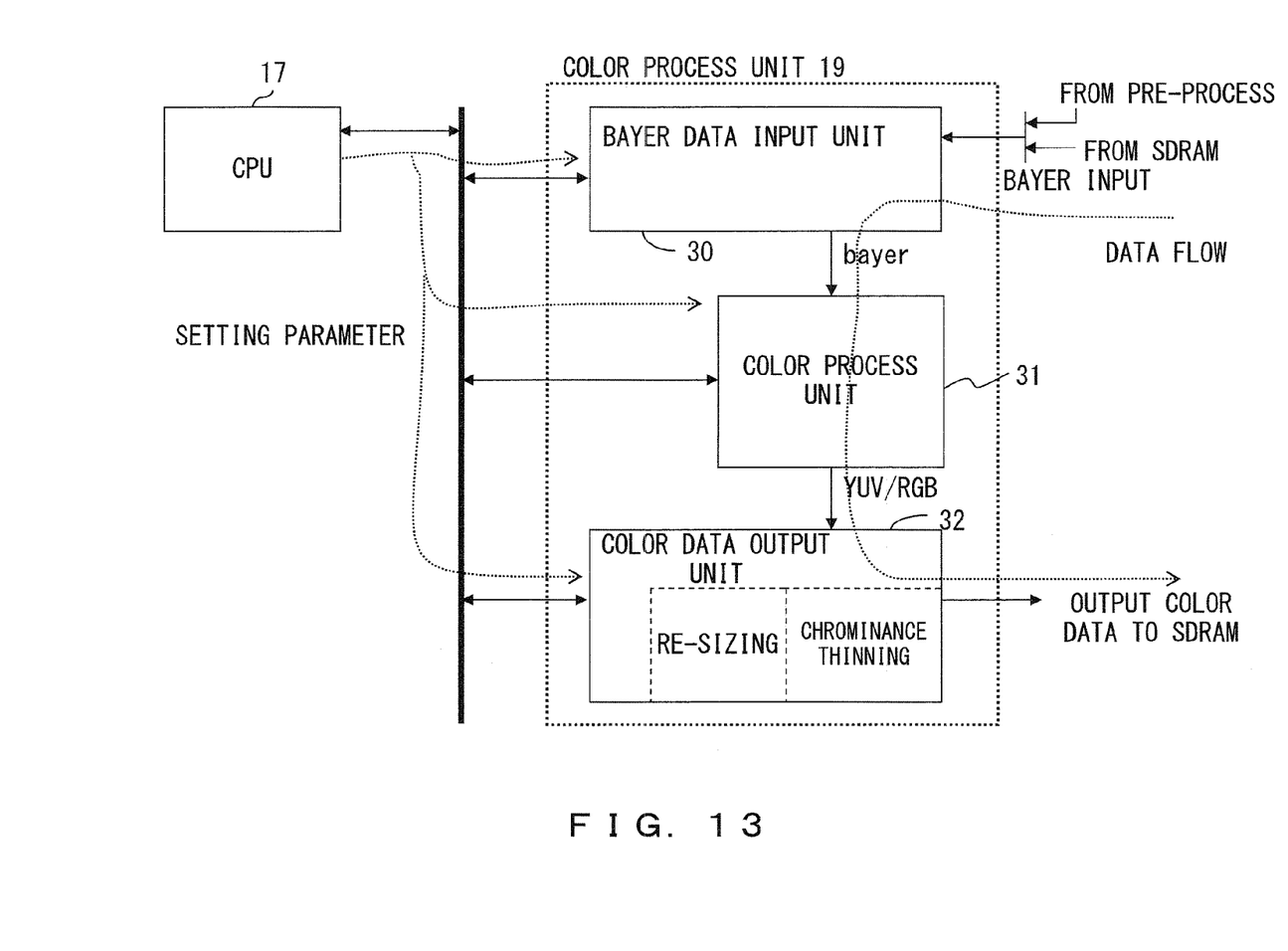
FIG. 13 is the first configuration of a color process unit.

FIG. 13 is the first configuration of the color process unit.

The parameters of a divided still picture are calculated by the CPU 17 as follows. All parameters including ones described earlier are calculated and given to image data which is processed like motion picture→still picture [1]→motion picture→still picture [2]→motion picture by the CPU 17. Bayer data to be inputted is obtained by a Bayer data input unit 30 and is converted to a YUV signal by a color process unit 31. A color data output unit 32 performs the re-sizing and chrominance thinning of the image signal and color data to the SDRAM controller 23.

Figure 14:
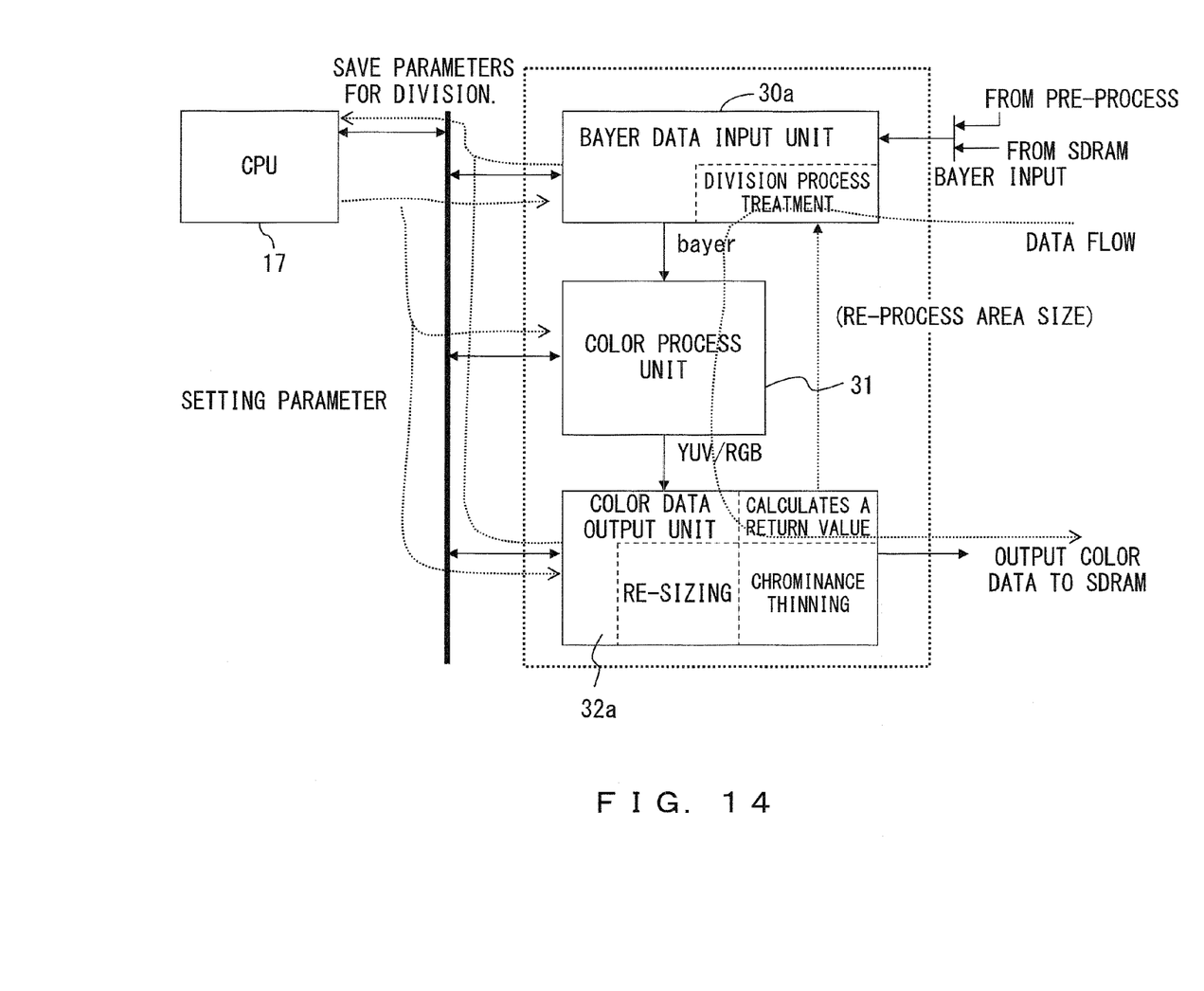
FIG. 14 is the second configuration of a color process unit.

FIG. 14 is the second configuration of the color process unit.

A configuration for preparing parameters using hardware in which the earlier-described division can be easily re-started is illustrated in FIG. 14. When the process of divided data is completed, the color data output unit 32a calculates a return value and the Bayer data input 30a receives a re-process area size obtained by this. Thus, parameters for a subsequent process can be reported to the CPU 17. The CPU 17 reads the parameters and saves them while processing motion picture data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions and alterations could be made hereto without departing from the spirit and scope of the invention.

What is claimed is:

1. An image processing device for inputting both still picture data and motion picture data and performing a data process, the image processing device comprising
    a process unit configured to divide the still picture data into a plurality of areas and alternating a data process of a divided area of the still picture and a data process of the motion picture data, wherein
    a motion picture is displayed during a process of the still picture data, the still picture data is vertically divided, and the number of division of the still picture data is determined based on the number of pieces of the motion picture data displayed within a certain time, a time for processing a piece of the motion picture data and a time for processing one line of the still picture data.

2. The image processing device according to claim 1, wherein
    when a process of one divided area of the still picture data is completed, parameters of a starting position of a still picture data area for an area to be subsequently processed are calculated in advance.

3. The image processing device according to claim 1, wherein a process starting position of one area of the still picture data which is processed after one piece of the motion picture data is completed is included in one area of the still picture data processed immediately before.

4. The image processing device according to claim 3, wherein the starting position is a position returned to inside one area of the still picture data processed immediately before from an area including pixels for a filter process of a pixel near a division position by an area including an adjustment area for a resizing process.

5. A camera comprising:
    an image processing device configured to input both still picture data and motion picture data and performing a data process, and to divide the still picture data into a plurality of areas and alternating a data process of a divided area of the still picture and a data process of the motion picture data,
    wherein a motion picture is displayed during a process of the still picture data, the still picture data is vertically divided, and the number of division of the still picture data is determined based on the number of pieces of the motion picture data displayed within a certain time, a time for processing a piece of the motion picture data and a time for processing one line of the still picture data.

6. The camera according to claim 5,
    wherein when a process of one divided area of the still picture data is completed, parameters of a starting position of a still picture data area for an area to be subsequently processed are calculated in advance.

7. The camera according to claim 5,
    wherein a process starting position of one area of the still picture data which is processed after one piece of the motion picture data is completed is included in one area of the still picture data processed immediately before.

8. The camera according to claim 7,
wherein the starting position is a position returned to inside one area of the still picture data processed immediately before from an area including pixels for a filter process of a pixel near a division position by an area including an adjustment area for a resizing process.

9. An image processing method for inputting both still picture data and motion picture data and performing a data process, the image processing method comprising
dividing the still picture data into a plurality of areas; and
alternating a data process of a divided area of the still picture and a data process of the motion picture data,
wherein a motion picture is displayed during a process of the still picture data, the still picture data is vertically divided, and the number of division of the still picture data is determined based on the number of pieces of the motion picture data displayed within a certain time, a time for processing a piece of the motion picture data and a time for processing one line of the still picture data.

\* \* \* \* \*